(12) United States Patent
Shalev et al.

(10) Patent No.: US 9,569,357 B1
(45) Date of Patent: Feb. 14, 2017

(54) MANAGING COMPRESSED DATA IN A STORAGE SYSTEM

(71) Applicant: PURE Storage, Inc., Mountain View, CA (US)

(72) Inventors: Ori Shalev, Cupertino, CA (US); Ronald S. Karr, Palo Alto, CA (US); Wei Zhang, Santa Clara, CA (US)

(73) Assignee: Pure Storage, Inc., Mountain View, CA (US)

( * ) Notice: Subject to any disclaimer, the term of this patent is extended or adjusted under 35 U.S.C. 154(b) by 23 days.

(21) Appl. No.: 14/592,336

(22) Filed: Jan. 8, 2015

(51) Int. Cl.
| | |
|---|---|
| G06F 3/06 | (2006.01) |
| G06F 12/02 | (2006.01) |
| G06F 11/14 | (2006.01) |
| G06F 17/30 | (2006.01) |

(52) U.S. Cl.
CPC ......... G06F 12/0261 (2013.01); G06F 3/0641 (2013.01); G06F 11/1453 (2013.01); G06F 17/30159 (2013.01); G06F 2212/401 (2013.01); G06F 2212/702 (2013.01)

(58) Field of Classification Search
None
See application file for complete search history.

(56) References Cited

U.S. PATENT DOCUMENTS

| | | | |
|---|---|---|---|
| 5,208,813 A | 5/1993 | Stallmo | |
| 6,412,045 B1 | 6/2002 | DeKoning et al. | |
| 6,799,283 B1 | 9/2004 | Tamai et al. | |
| 6,915,434 B1 | 7/2005 | Kuroda | |
| 7,028,216 B2 | 4/2006 | Aizawa et al. | |
| 7,216,164 B1 | 5/2007 | Whitmore et al. | |
| 8,352,540 B2 | 1/2013 | Anglin et al. | |
| 9,423,967 B2 | 8/2016 | Colgrove et al. | |
| 9,436,396 B2 | 9/2016 | Colgrove et al. | |
| 9,436,720 B2 | 9/2016 | Colgrove et al. | |
| 9,454,476 B2 | 9/2016 | Colgrove et al. | |
| 9,454,477 B2 | 9/2016 | Colgrove et al. | |
| 2002/0038436 A1 | 3/2002 | Suzuki | |

(Continued)

FOREIGN PATENT DOCUMENTS

| | | |
|---|---|---|
| WO | WO-2008/102347 A1 | 8/2008 |
| WO | WO-2010/071655 A1 | 6/2010 |

OTHER PUBLICATIONS

Micosoft Corporation "GCSettings.IsServerGC Property", Retrieved Oct. 27, 2013 via the WayBack Machine, 3 pages.

(Continued)

*Primary Examiner* — Kaushikkumar Patel
(74) *Attorney, Agent, or Firm* — Edward J. Lenart; Kennedy Lenart Spraggins LLP

(57) ABSTRACT

Systems, methods, and computer readable storage mediums for optimistically managing compressed data in a storage system. When possible, multiple input blocks are compressed into a buffer and stored in a single physical block on a storage device. The metadata of the multiple input blocks can be managed separately. A fingerprint of the compressed buffer can be generated and used as an index to the single physical block. Alternatively, fingerprints of the uncompressed input blocks can be generated, and reference counts can be maintained to track the number of input blocks which reference the compressed buffer.

17 Claims, 12 Drawing Sheets

(56) References Cited

U.S. PATENT DOCUMENTS

| | | | |
|---|---|---|---|
| 2003/0218554 A1* | 11/2003 | McGuire | H03M 7/40 341/65 |
| 2004/0049572 A1 | 3/2004 | Yamamoto et al. | |
| 2005/0131939 A1* | 6/2005 | Douglis | H03M 7/30 |
| 2007/0171562 A1 | 7/2007 | Maejima et al. | |
| 2007/0220313 A1 | 9/2007 | Katsuragi et al. | |
| 2008/0059699 A1 | 3/2008 | Kubo et al. | |
| 2008/0155191 A1 | 6/2008 | Anderson et al. | |
| 2008/0178040 A1 | 7/2008 | Kobayashi | |
| 2008/0275928 A1 | 11/2008 | Shuster | |
| 2009/0204858 A1 | 8/2009 | Kawaba | |
| 2009/0228648 A1 | 9/2009 | Wack | |
| 2010/0067706 A1 | 3/2010 | Anan et al. | |
| 2010/0250882 A1 | 9/2010 | Hutchison et al. | |
| 2010/0313040 A1* | 12/2010 | Lumb | G06F 3/0608 713/193 |
| 2011/0107052 A1* | 5/2011 | Narayanasamy | G06F 3/0608 711/171 |
| 2011/0231485 A1* | 9/2011 | Shalev | H03M 7/30 709/203 |
| 2011/0238634 A1 | 9/2011 | Kobara | |
| 2011/0238914 A1* | 9/2011 | Hirayama | H03M 7/30 711/118 |
| 2011/0252184 A1* | 10/2011 | Cho | G06F 3/0608 711/102 |
| 2012/0023375 A1 | 1/2012 | Dutta et al. | |
| 2012/0158672 A1* | 6/2012 | Oltean | G06F 17/30091 707/692 |
| 2012/0296922 A1* | 11/2012 | Hsu | G06F 3/0619 707/756 |
| 2013/0046995 A1 | 2/2013 | Movshovitz | |
| 2013/0047029 A1 | 2/2013 | Ikeuchi et al. | |
| 2013/0091102 A1 | 4/2013 | Nayak | |
| 2013/0339303 A1 | 12/2013 | Potter et al. | |
| 2014/0032507 A1* | 1/2014 | Voigt | G06F 3/0641 707/692 |
| 2014/0089730 A1 | 3/2014 | Watanabe et al. | |
| 2014/0172929 A1 | 6/2014 | Sedayao et al. | |
| 2014/0244604 A1* | 8/2014 | Oltean | H03M 7/30 707/693 |
| 2014/0281308 A1 | 9/2014 | Lango et al. | |
| 2015/0234709 A1 | 8/2015 | Koarashi | |
| 2015/0244775 A1 | 8/2015 | Vibhor et al. | |
| 2015/0278534 A1 | 10/2015 | Thiyagarajan et al. | |
| 2016/0004598 A1* | 1/2016 | Lillibridge | G06F 11/1448 707/654 |
| 2016/0019114 A1 | 1/2016 | Han et al. | |
| 2016/0050297 A1* | 2/2016 | Koifman | G06F 12/1408 707/693 |
| 2016/0092137 A1* | 3/2016 | Doerk | G06F 3/0641 711/159 |

OTHER PUBLICATIONS

Microsoft Corporation, "Fundamentals of Garbage Collection", Retrieved Aug. 30, 2013 via the WayBack Machine, 11 pages.

* cited by examiner

405A

| Logical Address | Fingerprint (FP) | FP Reference Count |
|---|---|---|
| 305 | FP-305 | 1 |
| 310 | FP-310 | 1 |
| 315 | FP-315 | 1 |
| 320 | FP-320 | 1 |
| 325 | FP-325 | 1 |
| 330 | FP-330 | 1 |

405B

| FP | Physical Address (PA) | Order | PA Reference Count | Compressed Y=1, N=0 | Type of Compression |
|---|---|---|---|---|---|
| FP-305 | 0x00482E32A0 | First | 3 | 1 | 01 |
| FP-310 | 0x00482E32A0 | Second |  | 1 |  |
| FP-315 | 0x00482E32A0 | Third |  | 1 |  |
| FP-320 | 0x0009DB1C04 | - | 1 | 0 | - |
| FP-325 | 0x002477A5E8 | - | 1 | 0 | - |
| FP-330 | 0x00B344EF70 | - | 1 | 0 | - |

410A

| Logical Address | Size | FP | FP Reference Count |
|---|---|---|---|
| 305 | 3 | FP-305/310/315 | 1 |
| 320 | 1 | FP-320 | 1 |
| 325 | 1 | FP-325 | 1 |
| 330 | 1 | FP-330 | 1 |

410B

| FP | Physical Address | PA Reference Count |
|---|---|---|
| FP-305/310/315 | 0x00482E32A0 | 1 |
| FP-320 | 0x0009DB1C04 | 1 |
| FP-325 | 0x002477A5E8 | 1 |
| FP-330 | 0x00B344EF70 | 1 |

415A

| Logical Address | FP | FP Reference Count |
|---|---|---|
| 305 | FP-305/310/315 | 3 |
| 310 | FP-305/310/315 |  |
| 315 | FP-305/310/315 |  |
| 320 | FP-320 | 1 |
| 325 | FP-325 | 1 |
| 330 | FP-330 | 1 |

415B

| FP | Physical Address | Order | PA Reference Count |
|---|---|---|---|
| FP-305/310/315 | 0x00482E32A0 | First | 1 |
| FP-305/310/315 | 0x00482E32A0 | Second | 1 |
| FP-305/310/315 | 0x00482E32A0 | Third | 1 |
| FP-320 | 0x0009DB1C04 | - | 1 |
| FP-325 | 0x002477A5E8 | - | 1 |
| FP-330 | 0x00B344EF70 | - | 1 |

FIG. 4

| Logical Address | Fingerprint | Storage Device | Physical Address | Order | PA Reference Count |
|---|---|---|---|---|---|
| 615A | FP-615A | 605A | 0x8DAE | First | 2 |
| 615B | FP-615B | 605A | 0x8DAF | - | 1 |
| 615C | FP-615C | 605A | 0x8DB0 | - | 1 |
| 620A | FP-620A | 605A | 0xA256 | - | 1 |
| 620B | FP-620B | 605A | 0x8DAE | Second | 2 |
| 620C | FP-620C | 605A | 0xA257 | - | 1 |
| 620D | FP-620D | 605A | 0xA258 | - | 1 |
| 625A | FP-625A | 605A | 0x4E72 | - | 1 |
| 625B | FP-625B | 605B | 0x4E73 | First | 3 |
| 625C | FP-625C | 605B | 0x4E74 | - | 1 |
| 630A | FP-630A | 605B | 0x4E73 | Second | 3 |
| 630B | FP-630B | 605B | 0x66B8 | - | 1 |
| 630C | FP-630C | 605B | 0x4E73 | Third | 3 |
| 630D | FP-630D | 605B | 0x66B9 | - | 1 |
| 630E | FP-635A | 605B | 0x66BA | - | 1 |
| 635A | FP-635A | 605C | 0x2F05 | - | 1 |
| 635B | FP-635B | 605C | 0x2F06 | - | 1 |
| 635C | FP-635C | 605C | 0x2F07 | - | 1 |
| 640A | FP-640A | 605C | 0x3518 | - | 1 |
| 640B | FP-640B | 605C | 0x3519 | - | 1 |
| 640C | FP-640C | 605C | 0x351A | - | 1 |

FIG. 8

MANAGING COMPRESSED DATA IN A STORAGE SYSTEM

BACKGROUND

Technical Field

Embodiments described herein relate to storage systems, and more particularly, to techniques for optimistically managing compressed data in storage systems based on data mapping into small fixed-sized blocks.

Description of the Related Art

Managing compressed data in a fixed-size block storage system presents multiple challenges. Input data streams can be partitioned into equal-sized blocks, but compressing the equal-sized input blocks results in compressed buffers of arbitrary size, which do not fit nicely into the fixed-size physical locations on the target storage devices. Also, combining compression with deduplication can increase the complexity of the storage system. To reduce metadata overhead, the input block size used for partitioning the input data stream could be increased, but this would have a negative effect on the deduplication ratio, as deduplication is typically implemented by block hashing. On the other hand, compressing small input blocks is typically sub-optimal because compression algorithms tend to be less efficient on smaller sized input data.

SUMMARY

Various embodiments of systems and methods for optimistically managing compressed data in storage systems based on mapping data into small fixed-sized physical blocks are contemplated.

In one embodiment, a storage system supporting block-level deduplication may include one or more storage controllers and one or more storage devices. The storage controller may receive write operations from one or more hosts and/or one or more clients. The storage controller may be configured to examine the write data corresponding to the write operations and determine whether multiple adjacent blocks of the write data may be compressed into a smaller number of physical blocks on the one or more storage devices.

In one embodiment, for input data blocks which the storage controller is able to compress into chunks that fit smaller numbers of physical storage blocks, the storage controller may separately manage the metadata of the each of the input data blocks that share the same fingerprint and the same target physical blocks. If the input data blocks are not compressible, then the storage controller may be configured to store these input data blocks in multiple physical blocks without compressing the input data blocks.

In various embodiments, the storage controller may be configured to manage the metadata associated with a plurality of compressed buffers, wherein each compressed buffer stores two or more compressed input data blocks. In one embodiment, the metadata for a compressed buffer may be indexed with the compressed buffer's fingerprint, wherein the fingerprint is generated from the compressed buffer rather than from any of the corresponding uncompressed input data blocks. The metadata may include an indication of the order of the input data blocks within the compressed buffer. The storage controller may be configured to perform reference tracking for stored physical blocks, and reference tracking may be performed in various ways, depending on the embodiment. In some embodiments, reference tracking may utilize reference counts for storage blocks. In other embodiments, reference tracking may be performed by the storage controller without utilizing reference counts for the physical storage blocks. Rather, the storage controller may utilize a mark and sweep technique to perform garbage collection. In another embodiment, reference tracking may include maintaining a count for each physical block to track the number of different fingerprints which reference the physical block. In this embodiment, a reference counter tracking live data in the shared compressed physical block may be associated with the compressed buffer's fingerprint. In another embodiment, the metadata for a compressed buffer may be indexed with multiple fingerprints of each of the uncompressed input data blocks. In this embodiment, a separate reference count may be maintained to track how many unique fingerprints point to the physical address of the physical block. In some embodiments, the separate reference count may have a 1-bit, 2-bit, 4-bit, or any other desired number of bits. Depending on the embodiment, the reference count may be stored in memory and/or stored with the compressed buffer on the target storage device.

In one embodiment, the storage controller may dynamically change the size of the logical address range which is deduplicated based on the compressibility of the corresponding data. For example, in one embodiment, if two adjacent input data blocks are not compressible to a size less than or equal to the minimal addressable unit of a target storage device, then deduplication may be performed by generating fingerprints for data with a logical address range equal to the size of a single input data block. If two adjacent input data blocks are compressible to a size less than or equal to the minimal addressable unit of a target storage device, then deduplication may be performed by generating fingerprints for compressed data with a logical address range equal to the size of two input data blocks. If three adjacent input data blocks are compressible to a size less than or equal to the minimal addressable unit of a target storage device, then deduplication may be performed by generating fingerprints for compressed data with a logical address range equal to the size of three input data blocks. This pattern may be continued for any number of adjacent input data blocks which can be compressed to fit within a minimal address unit of a storage device.

These and other embodiments will become apparent upon consideration of the following description and accompanying drawings.

BRIEF DESCRIPTION OF THE DRAWINGS

FIG. 4 illustrates three separate embodiments of tables for storing the mapping and fingerprint data for input data blocks.

FIG. 8 illustrates one embodiment of a table for storing mapping information of compressed and uncompressed blocks.

Figure 1:
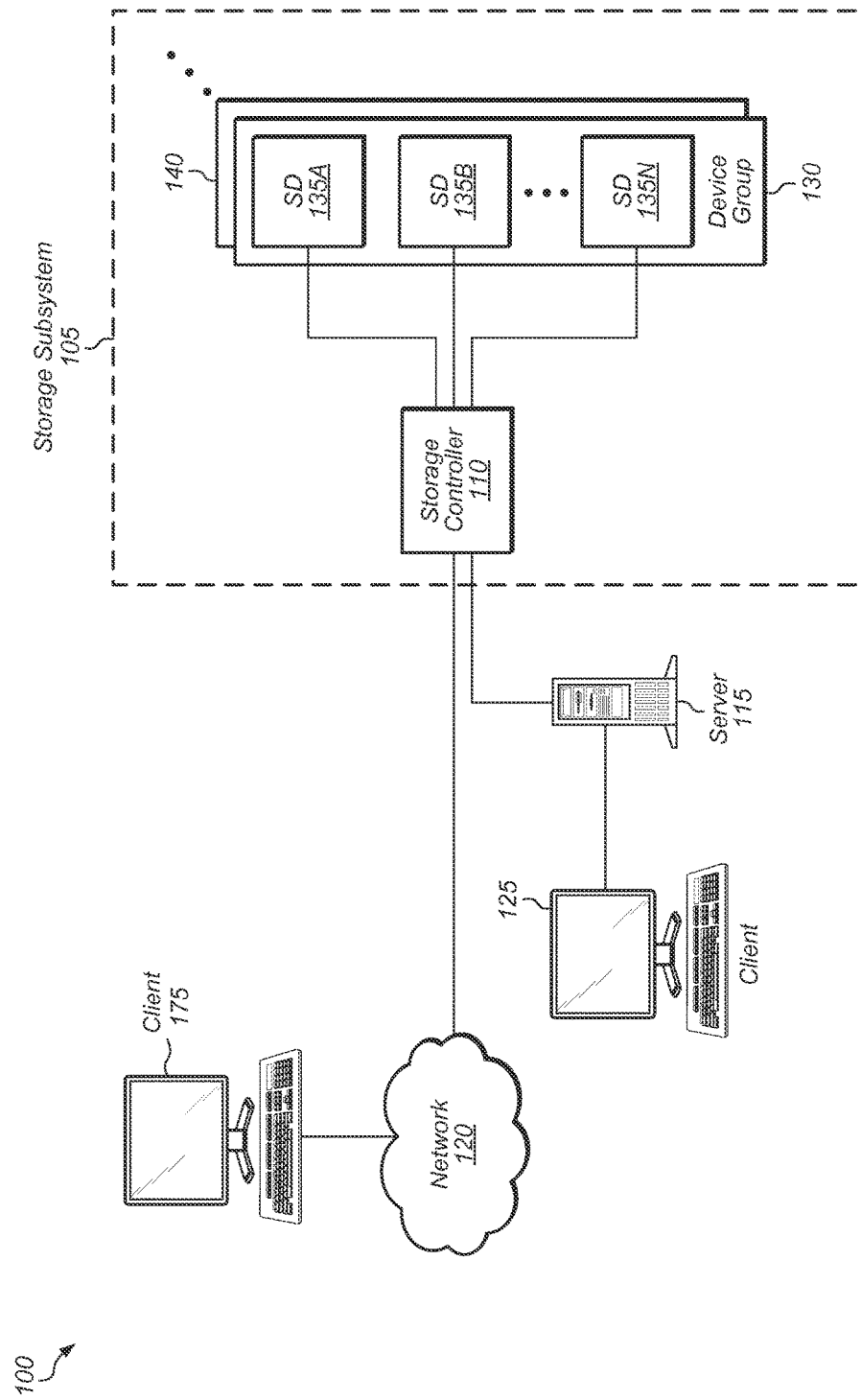
FIG. 1 is a generalized block diagram illustrating one embodiment of a storage system.

While the methods and mechanisms described herein are susceptible to various modifications and alternative forms, specific embodiments are shown by way of example in the drawings and are herein described in detail. It should be understood, however, that drawings and detailed description thereto are not intended to limit the methods and mechanisms to the particular form disclosed, but on the contrary, are intended to cover all modifications, equivalents and alternatives apparent to those skilled in the art once the disclosure is fully appreciated.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

TERMINOLOGY

The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a storage controller . . . ." Such a claim does not foreclose the system from including additional components (e.g., a network, a server, a display device).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a generalized block diagram of one embodiment of a storage system 100 is shown. Storage system 100 may include storage subsystem 105, and storage subsystem 105 may include storage controller 110 and storage device groups 130 and 140, which are representative of any number of storage device groups. As shown, storage device group 130 includes storage devices 135A-N, which are representative of any number and type of storage devices (e.g., solid-state drives (SSDs), Peripheral Component Interconnect Express (PCIe) cards). In one embodiment, storage subsystem 105 may be a storage array, while in other embodiments, storage subsystem 105 may be other types of storage subsystems (e.g., servers, storage shelves, storage devices, PCIe cards, flash drives, SSDs, storage clusters, data centers).

Storage controller 110 may be coupled to client computer system 125 via server 115, and storage controller 110 may be coupled remotely over network 120 to client computer system 175. Server 115 is representative of any number and type (e.g., file server, application server, block server, database server) of servers which may be coupled to storage subsystem 105. Server 115 may be configured to enable storage and retrieval of data from storage subsystem 105 by client 125 and one or more other clients (not shown). Additionally, any number and type of virtual servers may be hosted by server 115, depending on the embodiment. Although not shown in FIG. 1, client 175 may be coupled to one or more servers. Clients 125 and 175 are representative of any number of clients which may utilize storage system 100 for storing and accessing data. It is noted that some systems may include only a single client, connected directly or remotely to storage controller 110. It is also noted that storage subsystem 105 may include more than one storage controller in some embodiments.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-N to prevent loss of data due to the failure of a device or the failure of storage locations within a device. Storage controller 110 may also utilize any of various deduplication techniques and/or compression techniques for reducing the amount of data stored in storage devices 135A-N. The order in which deduplication and compression are performed may vary according to the embodiment. In one embodiment, storage controller 110 may perform deduplication followed by compression. In another embodiment, storage controller 110 may perform compression followed by deduplication. It should also be understood that multiple rounds of deduplication and compression may be performed. For example, data may be deduplicated inline by storage controller 110 prior to the data being stored on storage devices 135A-N. Then, another round of deduplication may be performed after the data is stored on storage devices 135A-N to further reduce the amount of data stored on storage devices 135A-N.

In various embodiments, multiple mapping tables may be maintained by storage controller 110. These mapping tables may include an address translation table, a deduplication table, an overlay table, and/or other tables. The address translation table may include a plurality of entries, with each entry holding a virtual-to-physical mapping for a corresponding data component. This mapping table may be used to map logical read/write requests from each of the client computer systems 125 and 175 to physical locations in storage devices 135A-N. A "physical" pointer value may be read from the mappings associated with a given dataset or snapshot during a lookup operation corresponding to a received read/write request. This physical pointer value may then be used to locate a storage location within the storage devices 135A-N. It is noted that the physical pointer value may not be direct. Rather, the pointer may point to another pointer, which in turn points to another pointer, and so on. For example, a pointer may be used to access another mapping table within a given storage device of the storage devices 135A-N that identifies another pointer. Consequently, one or more levels of indirection may exist between the physical pointer value and a target storage location.

In various embodiments, the address translation table may be accessed using a key comprising a logical volume, snapshot, or other dataset ID, a logical or virtual address, a sector number, and so forth. A received read/write storage access request may identify a particular volume, sector, and length. A sector may be a logical block of data stored in a volume or snapshot, with a sector being the smallest size of an atomic I/O request to the storage system. In one embodiment, a sector may have a fixed size (e.g., 512 bytes) and the mapping tables may deal with ranges of sectors. For example, the address translation table may map a volume or snapshot in sector-size units. The areas being mapped may be managed as ranges of sectors, with each range consisting of one or more consecutive sectors. In one embodiment, a range may be identified by <snapshot, start sector, length>, and this tuple may be recorded in the address translation table and one or more other tables. In one embodiment, the key value for accessing the address translation table may be the combination of the volume or snapshot ID and the received sector number. A key is an entity in a mapping table that distinguishes one row of data from another row. In other embodiments, other types of address translation tables may be utilized.

In one embodiment, the address translation table may map volumes or snapshots and block offsets to physical pointer values. Depending on the embodiment, a physical pointer value may be a physical address or a logical address which the storage device maps to a physical location within the device. In one embodiment, an index may be utilized to access the address translation table. The index may identify locations of mappings within the address translation table. The index may be queried with a key value generated from a volume ID and sector number, and the index may be searched for one or more entries which match, or otherwise correspond to, the key value. Information from a matching entry may then be used to locate and retrieve a mapping which identifies a storage location which is the target of a received read or write request. In one embodiment, a hit in the index provides a corresponding virtual page ID identifying a page within the storage devices of the storage system, with the page storing both the key value and a corresponding physical pointer value. The page may then be searched with the key value to find the physical pointer value.

The deduplication table may include information used to deduplicate data at a fine-grained level. The information stored in the deduplication table may include mappings between one or more calculated fingerprint values for a given data component and a physical pointer to a physical location in one of the storage devices 135A-N holding the given data component. In one embodiment, storage controller 110 may utilize a hash function to generate a fingerprint value for a given data component. In other embodiments, other types of fingerprints (e.g., SHA-1, MD4) may be generated for received data components. Entries of the deduplication table may also include a length of the corresponding data component and status information. It is noted that in some embodiments, one or more levels of indirection may exist between the physical pointer value and the corresponding physical storage location. Accordingly, in these embodiments, the physical pointer may be used to access another mapping table within a given storage device of the storage devices 135A-N.

Network 120 may utilize a variety of techniques including wireless connection, direct local area network (LAN) connections, wide area network (WAN) connections such as the Internet, a router, storage area network (SAN), Ethernet, and others. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP.

Client computer systems 125 and 175 are representative of any number of stationary or mobile computers such as desktop personal computers (PCs), servers, server farms, workstations, laptops, handheld computers, servers, personal digital assistants (PDAs), smart phones, tablets, and so forth. Generally speaking, client computer systems 125 and 175 include one or more processors comprising one or more processor cores. Each processor core includes circuitry for executing instructions according to a predefined general-purpose instruction set. The processor cores may access cache memory subsystems for data and computer program instructions. The cache subsystems may be coupled to a memory hierarchy comprising random access memory (RAM) and a storage device.

It is noted that in alternative embodiments, the number and type of storage subsystems, client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Figure 2:
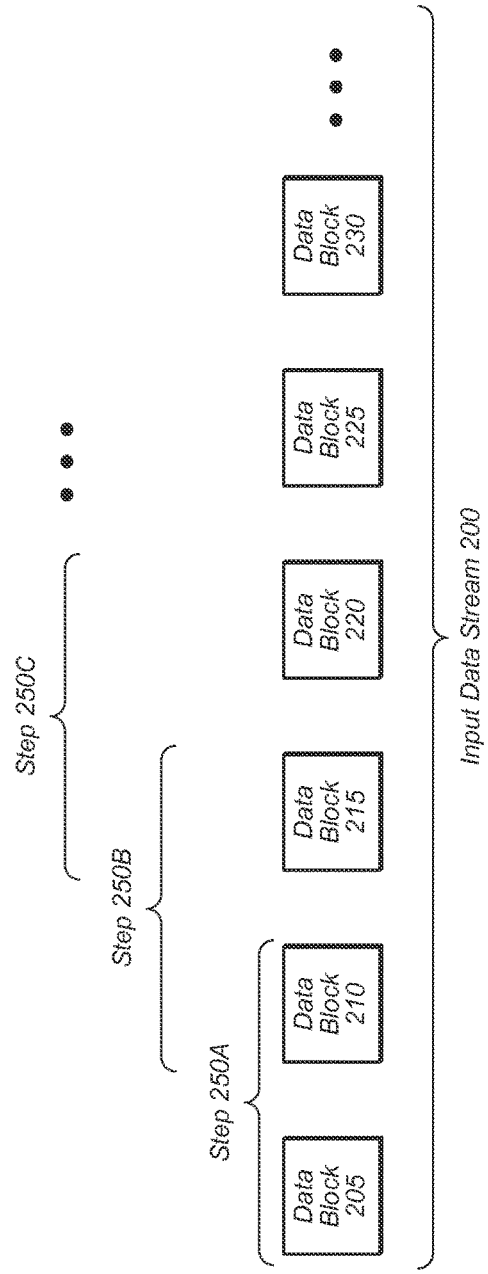
FIG. 2 is a logical block diagram illustrating a technique for optimistically compressing neighboring input data blocks.

Turning now to FIG. 2, a block diagram illustrating a technique for optimistically compressing neighboring input data blocks is shown. An input data stream 200 may be received by a storage controller (e.g., storage controller 110 of FIG. 1) as part of write data for a write operation from a given client or host. In one embodiment, input data stream 200 may be partitioned into equal-sized data blocks 205, 210, 215, 220, 225, 230, etc. In one embodiment, the size of data blocks 205-230 may be 4 kilobytes (KB). In other embodiments, data blocks 205-230 may be other sizes. In another embodiment, input data stream 200 may be partitioned into variable sized data blocks. For example, separate areas of physical storage may be used for storing different sizes of data blocks to prevent the storage space from being fragmented with variable blocking. In one embodiment, a first area may store 4 KB blocks and a second area may store 8 KB blocks. Other areas may also be utilized for storing other sizes of blocks.

The storage controller may be configured to examine neighboring data blocks to determine if neighboring data blocks can be compressed to a size less than or equal to the size of a physical block on a storage device coupled to the storage controller. In one embodiment, the size of the physical block may be equal to the size of each of the data blocks 205-230 in input data stream 200. Any of various suitable types of compression (e.g., Lempel-Ziv-Welch algorithms) may be utilized, depending on the embodiment. In one embodiment, input data stream 200 may represent data after deduplication has been performed to remove duplicate blocks. It may be assumed for the purposes of this discussion that all of the data blocks 205-230 do not match any existing data blocks stored in the storage system.

As shown in FIG. 2, a storage controller may perform step 250A to determine if data blocks 205 and 210 can be compressed into the size of a single physical block. If data blocks 205 and 210 are able to be compressed into a single physical block, then the storage controller may compress these two blocks and store the compressed data in a single physical block on a target storage device. If data blocks 205 and 210 are not able to be compressed into a single physical block, then the storage controller may store data block 205 in its own physical block, and then storage controller may perform step 250B to determine if data blocks 210 and 215 can be compressed into the size of a single physical block. This process may continue in the same manner for step 250C and a plurality of similar steps moving through the data stream until the entirety of input data stream 200 has been processed.

In one embodiment, the size of the physical block on the storage device(s) coupled to the storage controller may be 4 KB. In other embodiments, the storage device(s) coupled to the storage controller may have other sizes of physical blocks, and in some cases, the storage device(s) may have multiple different sizes of physical blocks. It is noted that the technique of looking at neighboring blocks and determining whether two neighboring blocks will fit into a single physical block may be implemented in a similar but slightly different fashion if the input blocks are larger than the physical blocks.

For example, in one embodiment, the input data stream may be partitioned into blocks of 8 KB and the physical block size may be 4 KB. In this embodiment, the storage controller may attempt to compress each 8 KB input block into a single 4 KB physical block. If a given 8 KB input block can be compressed into a 4 KB buffer, then this input block may be compressed and stored in a single physical block. If the given 8 KB input block cannot be compressed into a 4 KB buffer, then the input block may be stored in an uncompressed form in two physical blocks. Variations of this scheme may be utilized in other embodiments depending on the respective sizes of input data blocks and physical blocks. For example, in another embodiment, an input data block may be three times the size of a physical block, and the storage controller may first attempt to compress the input data block into a single physical block, then the storage controller may attempt to compress the input data block into two physical blocks, and then finally the storage controller may store the input data block in three physical blocks if the prior two attempts were unsuccessful.

Figure 3:
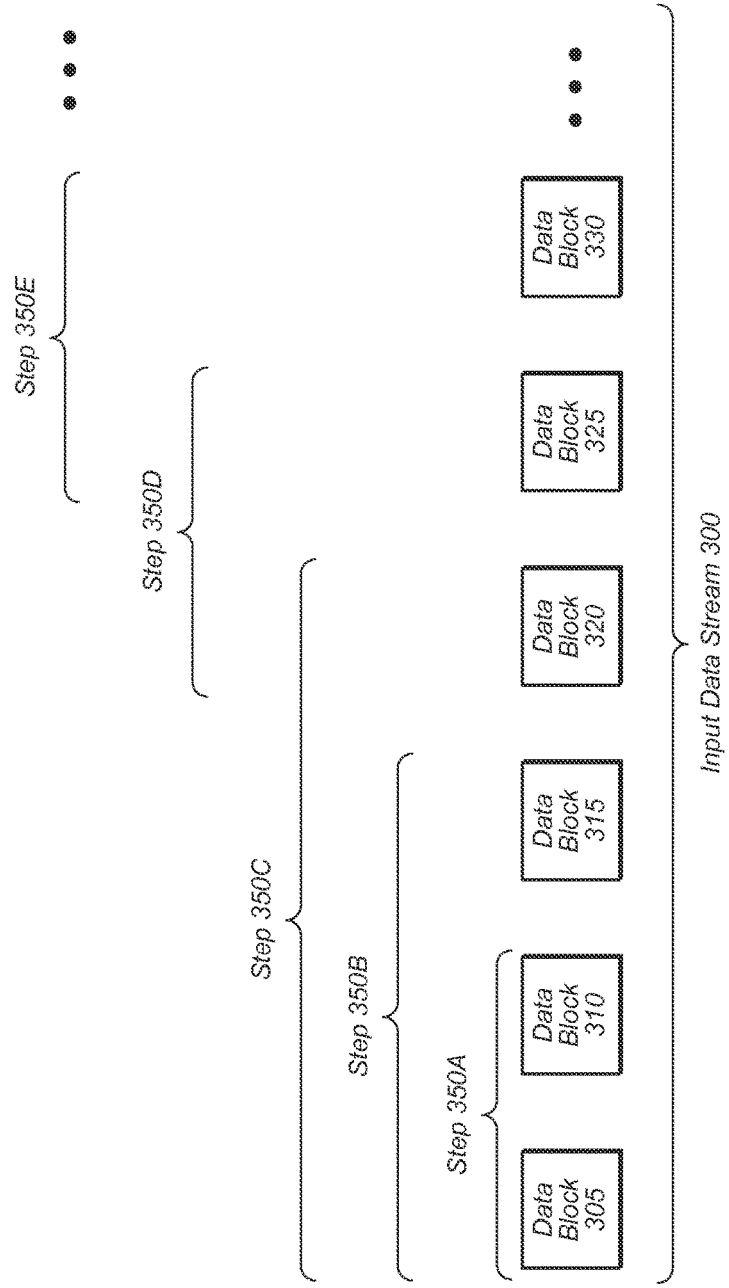
FIG. 3 illustrates another technique for optimistically compressing neighboring data blocks in accordance with one embodiment.

Referring now to FIG. 3, another technique for optimistically compressing neighboring data blocks is shown. In the embodiment shown in FIG. 3, the storage controller may attempt to compress two neighboring data blocks 305 and 310 in step 350A, and if data blocks 305 and 310 can be compressed into a single physical block, the storage controller may attempt to compress three neighboring data blocks 305, 310, and 315 into a single physical block in step 350B. It may be assumed for the purposes of this discussion that the storage controller determined that the three neighboring data blocks 305, 310, and 315, when compressed, would fit into a single physical block in step 350B. Therefore, the storage controller may attempt to compress four neighboring data blocks 305, 310, 315, and 320 into a single physical block in step 350B. It may be assumed for the purposes of this discussion that the storage controller determined that the four neighboring data blocks 305, 310, 315, and 320, when compressed, would not fit into a single physical block in step 350C. Therefore, in step 350D, the storage controller may determine if data blocks 320 and 325 can be compressed together into a single physical block in step 350D. It may be assumed that data blocks 320 and 325 cannot be compressed together into a single physical block, and so the storage controller may next determine if data blocks 325 and 330 can be compressed together into a single physical block in step 350E. This pattern of steps may be continued as the storage controller continues to process the input data stream 300 and attempts to achieve data reduction by compressing neighboring input data blocks.

In one embodiment, the storage controller may search for a matching fingerprint for a given input data block prior to attempting to compress the given input data block with one or more neighboring input data blocks. For example, if the given input data block's fingerprint matches another fingerprint already stored in the system, then the storage controller may not try to compress the given input data block with adjacent input data blocks. Rather, in this case, the storage controller may map the logical address of the given input data block to the matching fingerprint and increment the fingerprint's reference count. Then, the storage controller may move on to the next group of input data blocks in the input data stream, generate a fingerprint for each input data block in the group, search for a match to each fingerprint, and then attempt to compress the data blocks together if no matching fingerprints are found. It is noted that any suitable technique for generating a fingerprint may be utilized. For example, in one embodiment, a hash function may be utilized for generating a fingerprint. In other embodiments, other methods for generating fingerprints may be utilized.

Generally speaking, the storage controller may attempt to fit as many neighboring blocks as possible into a single physical block. This is a variation of the scheme shown in FIG. 2 where the storage controller only attempted to compress two neighboring blocks into a single physical block. In other embodiments, the storage controller may attempt to fit multiple neighboring blocks into two or more physical blocks. For example, the storage controller may attempt to fit three or more neighboring input blocks into two physical blocks. In another example, the storage controller may attempt to compress four or more neighboring input blocks into three physical blocks. Further variations of these schemes are possible and are contemplated. Generally speaking, the storage controller may attempt to compress 'N' neighboring input data blocks into 'M' physical blocks, wherein 'N' and 'M' are integers, and wherein the total size of the 'M' physical blocks is less than the total size of the 'N' input data blocks.

In some embodiments, the storage device physical block may be larger than the input data blocks. In these embodiments, the storage controller may be configured to pack as many compressed input data blocks as possible that will fit into a single storage device physical block. The storage controller may be configured to store, in a given mapping table, the order of the compressed input data blocks within the physical block. Alternatively, the order of the input data blocks may be based on the logical address, fingerprint value, or other value such that the order does not need to be recorded because the storage controller will be able to determine the order from other data associated with the input data blocks. Rather, the number of input data blocks compressed into a single physical block may be recorded and the fingerprints may point to the physical address of the physical block.

For example, in one embodiment, the input data blocks may be 8 KB and the physical blocks may be 64 KB. If more than eight adjacent input data blocks are not capable of being compressed to fit into a single physical storage block, then only eight input data blocks may be stored in a single physical block. Otherwise, more than eight compressed data blocks may be stored in a single physical block. It is noted that the sizes of input data blocks and physical blocks may vary widely from embodiment to embodiment. The techniques described herein are intended to be implemented in a variety of scenarios, and one skilled in the art will appreciate that slight modifications may be employed to adapt these techniques to the different system conditions and sizes of blocks that may be encountered.

Turning now to FIG. 4, three separate embodiments of three sets of tables 405A-B, 410A-B, and 415A-B for storing the mapping and fingerprint data for input data blocks 305-330 are shown. In one embodiment, metadata for input data blocks 305-330 may be generated and stored, by a storage controller, as shown in tables 405A-B. In another embodiment, metadata for input data blocks 305-330 may be generated and stored, by a storage controller, as shown in tables 410A-B. In a further embodiment, metadata for input data blocks 305-330 may be generated and stored, by a storage controller, as shown in tables 415A-B. In a still further embodiment, any of the fields shown in tables 405A-B, 410A-B, and 415A-B may be combined together into one or more tables for maintaining metadata for compressing and deduplicating data.

Table 405A is a logical address to fingerprint mapping table which maps each logical address to the fingerprint generated from the data corresponding to that logical address. As shown in table 405A, the input data block 305-315 which are compressed and stored in the same physical block may each have their own fingerprint. In this embodiment, a fingerprint may be generated of each input data block prior to the input data blocks being compressed. Therefore, input data blocks 305, 310, and 315 have different fingerprints but share a common physical storage address. The fingerprints for input data blocks 305, 310, and 315 are shown as "FP-305", "FP-310", and "FP-315", respectively, to represent the actual fingerprint value. The actual fingerprint value will vary depending on both the actual data of block and the fingerprint generation method. Each entry in table 405A may also include a fingerprint reference count to indicate how many times the fingerprint is referenced (i.e., how many different logical addresses reference the same fingerprint). It may be assumed for the purposes of this discussion that each of input data blocks 305-330 is unique and has not already been stored in the storage system. Accordingly, each of the fingerprint (FP) reference counts in table 405A is set to one since each input data block 305-330 is unique and is not a duplicate of any existing data blocks stored in the storage system.

Table 405B is a fingerprint to physical address mapping table which maps each fingerprint to the physical address where the data which generated the fingerprint is stored. Table 405B may be utilized in combination with table 405A. Alternatively, in another embodiment, the information stored in tables 405A and 405B may be combined into a single table. In one embodiment, each entry for a unique physical address in table 405B may also include a physical block reference count to indicate how many different fingerprints reference the corresponding physical block. In this example, the physical address reference count of physical address "0x00482E32A0" is shown as three since the physical address "0x00482E32A0" is referenced by three different fingerprints "FP-305", "FP-310", and "FP-315". In one embodiment, only the first of the three entries of table 405B may store the physical address reference count since the first three entries of table 405B all refer to the same physical address "0x00482E32A0". In some embodiments, the physical address reference count may (as an alternative or in addition) be stored in the actual physical block rather than in table 405B. In a further embodiment, the physical address reference count may be stored in a separate table (not shown) mapping physical address to physical address reference count. In other embodiments, the physical address reference count may be stored in other locations. The physical address reference count may be utilized, in combination with the corresponding fingerprint reference count, to determine when the data stored at that physical address is invalid and can be deleted. In some embodiments, a physical block may be freed when the corresponding reference count is decremented to zero. In other embodiments, freeing of a block may be delayed to a later point in time. For example, in some embodiments, when the physical address reference count of a given input data block is decremented to zero, the corresponding physical block may not be immediately reclaimed. Rather the freeing of the physical block may be delayed until garbage collection is performed at a later point in time or any other desired point in time.

It should be understood that although the tables in FIG. 4 are shown as including reference counts (fingerprint and physical address), storage controllers in other embodiments may not utilize reference counts. For example, in other embodiments, the tables maintained by the storage controller may not include reference counts, and instead the storage controller may perform garbage collection based on mark-and-sweep or other techniques which do not rely on maintaining reference counts for physical addresses and/or for fingerprints. As is well known to those skilled in the art, a mark and sweep algorithm generally entails identifying physical storage blocks that are no longer in use by the system. In one embodiment, the mark and sweep algorithm includes two phases. A first phase (referred to as the marking phase) involves finding and marking all reachable physical storage blocks beginning with root objects and recursively traversing objects referenced by these objects and objects referenced by the traversed objects. Objects which are reachable are deemed "in use" and marked as such. A second phase (referred to as the sweep phase) involves reclaiming physical storage blocks not marked in the first phase. Variations on the algorithm exists and are contemplated as well.

Each entry in table 405B may also include a compression indicator (e.g., yes=1 and no=0) and a field indicating the type of compression utilized. Alternatively, in another embodiment, the compression indicator and/or type of compression may be omitted from table 405B, and the storage controller may determine if the data stored at a given physical storage block is compressed (and what type of compression is used) by reading the header of the block. In some embodiments, more than one type of compression may be utilized to compress input data blocks. Although not shown in table 405B, in another embodiment, each entry may also include an indicator of how many compressed blocks are stored in the corresponding physical address.

Tables 410A-B represent a pair of tables which may utilized in another embodiment for the same input data blocks 305-330 from FIG. 3. As shown in table 410A, the input data blocks 305, 310, and 315 may share a single entry and a common fingerprint "FP-305/310/315". In the embodiment represented by table 410A, input data blocks 305, 310, and 315 may be compressed into a compressed buffer, and then a fingerprint "FP-305/310/315" may be generated from the compressed buffer. In one embodiment, after the fingerprint "FP-305/310/315" for the compressed buffer, the original fingerprints for the uncompressed blocks 305-310 may be discarded.

There may be a size field in table 410A, with the size of the entry for logical address listed as '3' to represent the three input data blocks 305, 310, and 315. Table 410A illustrates an embodiment wherein the storage controller may dynamically change the size of the logical address range of each entry depending on the compressibility of the corresponding data. For data which can be compressed into a buffer smaller than or equal to the minimal addressable storage unit of a target storage device, the storage controller may generate fingerprints from data corresponding to larger sizes of logical address ranges. Table 410B may be used in conjunction with table 410A, such that when a given fingerprint is retrieved from table 410A for a given logical address, the given fingerprint may be mapped to the corresponding physical address using table 410B. Each entry of table 410B may include a physical address (PA) reference count which counts the number of different fingerprints which reference the corresponding physical storage block. The PA reference count may also be referred to as a physical block reference count, physical storage block reference count, or fingerprint to physical block reference count.

In another embodiment, table 415A-B may be utilized to store metadata associated with input data blocks 305-330. Table 415A may include a separate entry for blocks 305, 310, and 315, and each of these blocks may share the same fingerprint which was generated from a compressed buffer of the three compressed blocks 305, 310, and 315. The fingerprint reference count for the common fingerprint "FP-305/310/315" may be set to three after the input data blocks are processed since this common fingerprint is referenced by three separate logical addresses (corresponding to three separate input data blocks). In one embodiment, the fingerprint reference count for a given fingerprint may only be stored in a single location rather than keeping multiple copies of the fingerprint reference count. In this embodiment with table 415A, a size field may not be included in the entries since each separate input data block has its own entry in the table 415A. The order of the input data blocks within the compressed buffer stored at the physical location may also be included in each entry of table 415B, as well as a physical address reference count.

It is noted that the PA reference count may be stored separately from tables 405B, 410B, and 415B in some embodiments. For example, the PA reference count may be stored within the compressed buffer on the target storage device at the respective physical address. In one embodiment, the PA reference count may be a 1-bit, 2-bit, or 4-bit number. In other embodiments, the PA reference count may have other numbers of bits. The size of the PA reference count may be based on the size of the input data block relative to the size of the physical storage block and maximum expected number of input data blocks which can be compressed into a single physical storage block. In one embodiment, the PA reference count for a given physical address may only be stored in a single location rather than keeping multiple copies of the PA reference count.

Figure 5:
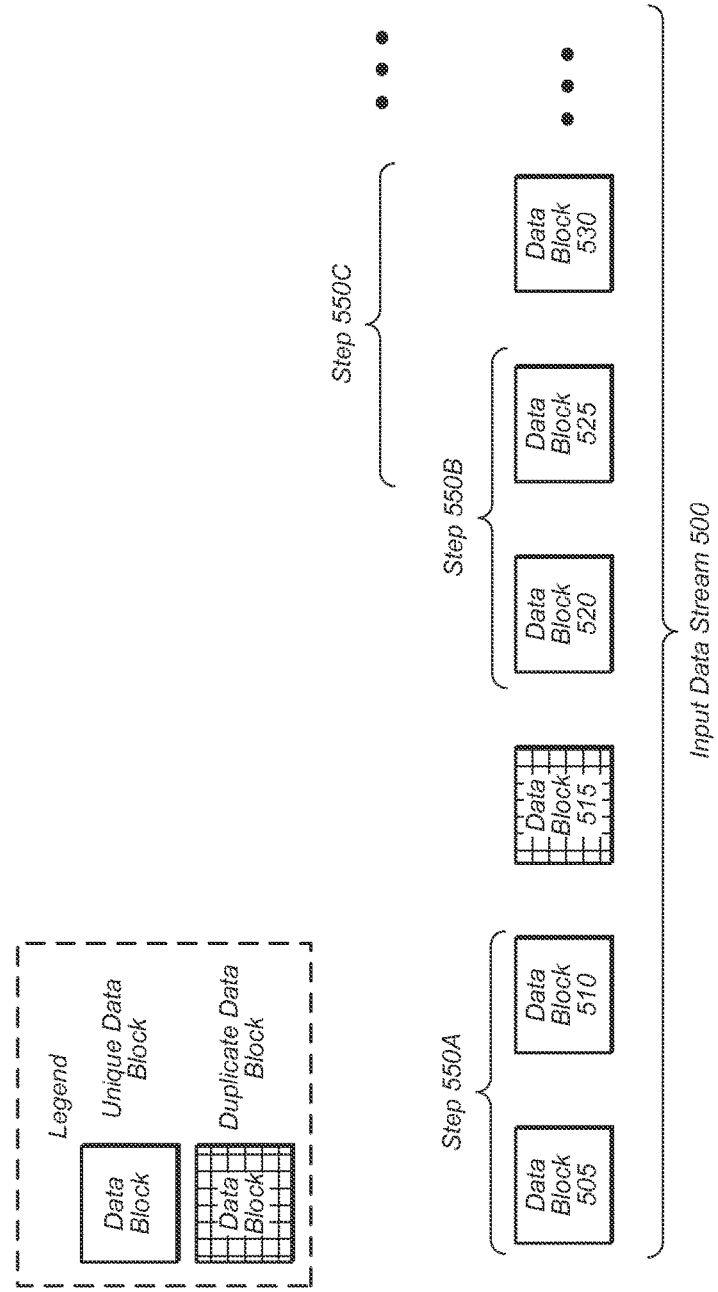
FIG. 5 illustrates another technique for optimistically compressing neighboring data blocks in accordance with one embodiment.

Referring now to FIG. 5, another embodiment of a technique for optimistically compressing neighboring data blocks is shown. In one embodiment, a storage controller (e.g., storage controller 110 of FIG. 1) may be configured to determine if an input data block already exists (i.e., perform deduplication) in the storage subsystem (e.g., storage subsystem 105) prior to attempting to compress the input data block with one or more neighboring input data blocks.

The storage controller may be configured to process input data stream 500 which consists of input data blocks 505-530 and any number of additional input data blocks (not shown). The storage controller may generate a fingerprint for each input data block and then search for a matching fingerprint among the fingerprints already generated for previously stored blocks. It may be assumed for the purposes of this discussion that after generating fingerprints for input data stream 500 and searching the fingerprint table(s) for matching fingerprints, the storage controller has determined that input data blocks 505-510 and 520-530 are unique and that input data block 515 is identical to an existing block stored on the storage subsystem. Accordingly, the storage controller may attempt to compress input data block 505 and 510 in step 550A and then skipping over input data block 515, the storage controller may attempt to compress input data block 520 and 525 in step 550B. Next, the storage controller may attempt to compress input data blocks 525 and 530 in step 550C (assuming blocks 520 and 525 could not be compressed into a single physical storage block), with this pattern continuing for the remainder of input data stream 500.

If the storage controller determines an input data block is a duplicate block, then the storage controller may store a mapping from the logical address of the input data block to the matching fingerprint and increment the matching fingerprint's reference count. In one embodiment, the storage controller may not attempt to compress duplicate input data blocks with neighboring blocks. Rather, the storage controller may move on to the next pair of input data blocks in the input data stream and attempt to compress this pair of input data blocks into a size less than or equal to a physical block on a target storage device.

Figure 6:
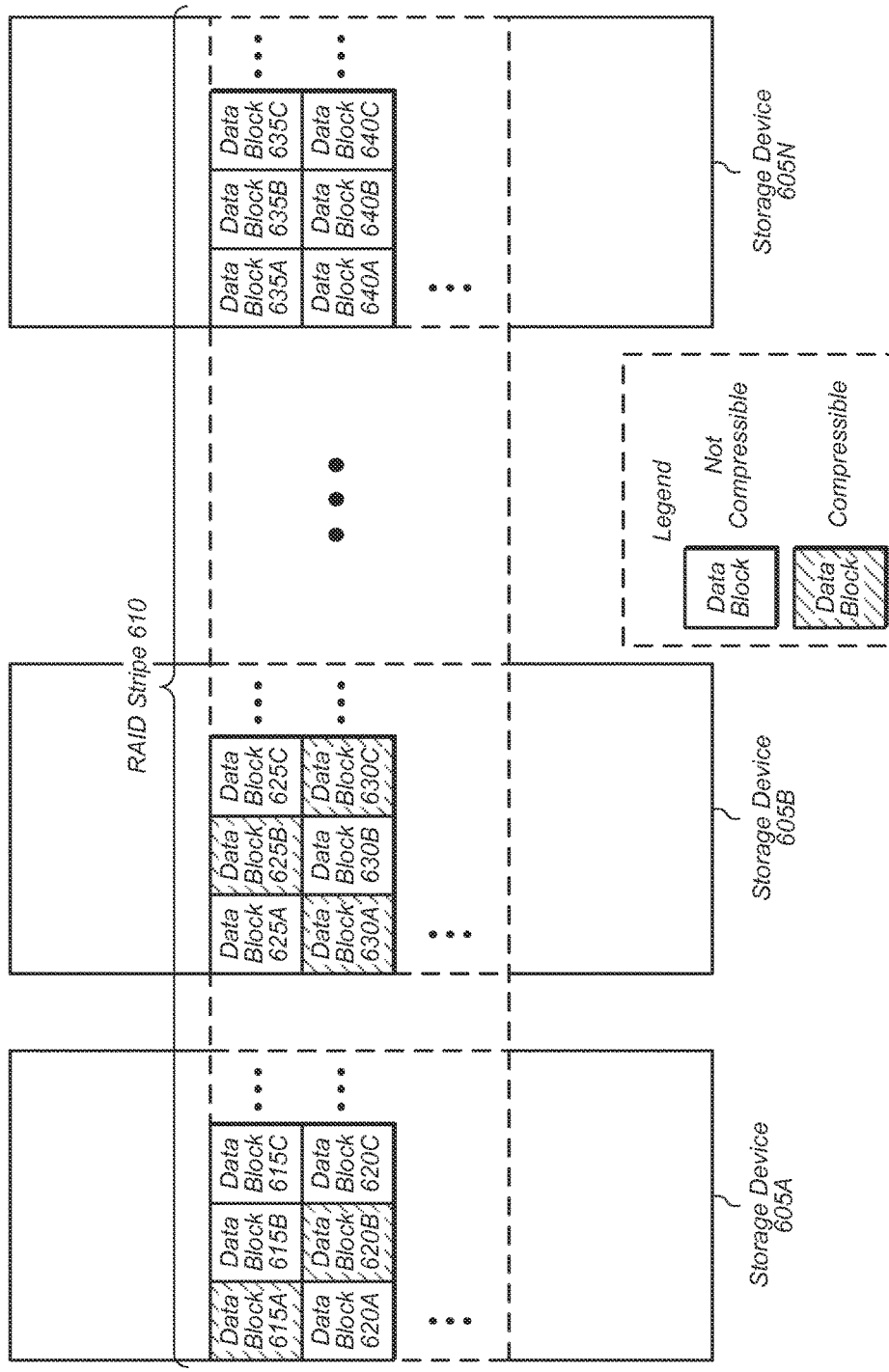
FIG. 6 is a logical block diagram of one embodiment of a redundant array of independent disks (RAID) stripe.

Turning now to FIG. 6, a logical block diagram of one embodiment of a redundant array of independent disks (RAID) stripe 610 is shown. A logical view of the RAID stripe 610 is shown in FIG. 6 which does not show the reduction in size of the logical data blocks due to compression. It may be assumed for the purposes of this discussion that the data blocks 615A-C, 620A-C, 625A-C, 630A-C, 635A-C, and 640A-C have corresponding fingerprints which did not match any existing fingerprints stored in the storage subsystem.

In one embodiment, the storage controller may select from the pool of input data blocks assigned to each chunk (wherein each chunk corresponds to a given storage device), and the storage controller may attempt to compress multiple input data blocks into a smaller number of physical blocks. This is a variation of the schemes shown in FIGS. 2 and 3, wherein the storage controller attempted to compress multiple neighboring blocks based on their locations within the input data stream. In the embodiment shown in FIG. 6, the location of blocks within the input data stream no longer plays a factor in how the storage controller determines to compress multiple input data blocks. In other words, the storage controller may select any two or more input data blocks, which are assigned to the same storage device, to compress together into a single physical block location, regardless of the proximity of the two or more input data blocks with respect to each other within the input data stream.

In another embodiment, the storage controller may compress data blocks together from the entire data group which is included within the RAID stripe 610 regardless of which storage device the blocks are initially assigned to. In other words, the storage controller may compress input data blocks together by choosing any input data blocks to combine together for compression. However, in some embodiments, the storage controller may choose which input data blocks to attempt to combine together based on at least one or more factors. These factors may include the input data block's target storage device within the RAID stripe, the logical address of the input data block, the fingerprint of the input data block, the compressibility of the input data block, and/or other factors.

In one embodiment, input data blocks may be assigned to storage devices within the RAID stripe based on their fingerprints. For example, a first range of fingerprint values may be assigned to a first storage device, a second range of fingerprint values may be assigned to a second storage device, and so on. In one embodiment, specific bits of the fingerprint value may be utilized for determining which storage device to store the corresponding input data block. For example, if there are a total of 16 storage devices, 4 bits of the fingerprint value may be utilized for determining the target storage device, with each unique 4-bit value being assigned to one of the 16 storage devices. In other embodiments, other techniques for assigning input data blocks to storage devices are possible and are contemplated.

In one embodiment, the storage controller may attempt to compress input data blocks together which are assigned to the same storage device within RAID stripe 610. In some embodiments, the storage controller may assign input data blocks to a storage device within RAID stripe 610 by taking into account the space saved due to compression to ensure that each chunk of RAID stripe 610 has an equal amount of stored data. For example, if a first chunk has input data blocks which are not compressed, and a second chunk has multiple input data blocks which have been compressed, the storage controller may include more input data blocks within the second chunk to ensure that the size of the first chunk as written to a first storage device is equal to the size of the second chunk as written to a second storage device.

In one embodiment, the storage controller may assign input data blocks to specific chunks within RAID stripe 610 and then the storage controller may analyze the input data blocks assigned to each chunk to determine which blocks can be compressed. In another embodiment, the storage controller may analyze the input data blocks to determine which blocks can be compressed and then the storage controller may assign individual input data blocks to specific chunks within RAID stripe 610 based at least in part on the compressibility of the blocks. In either case, the storage controller may attempt to compress input data blocks into a single physical block on a target storage device without limiting the attempt to neighboring blocks within the input data stream.

The legend in FIG. 6 shows that input data blocks which can be compressed are represented as squares with diagonal lines and input data blocks which are not compressible (i.e., are not able to be combined with other input data blocks into a single physical block) are represented as squares without background shading. As shown, non-adjacent blocks such as input data blocks 615A and 620B assigned to storage device 605A may be compressible and may be combined into a single physical block on storage device 605A. Also, non-adjacent blocks such as input data blocks 625B, 630A, and 630C may be compressible and may be combined into a single physical block on storage device 605B.

Figure 7:
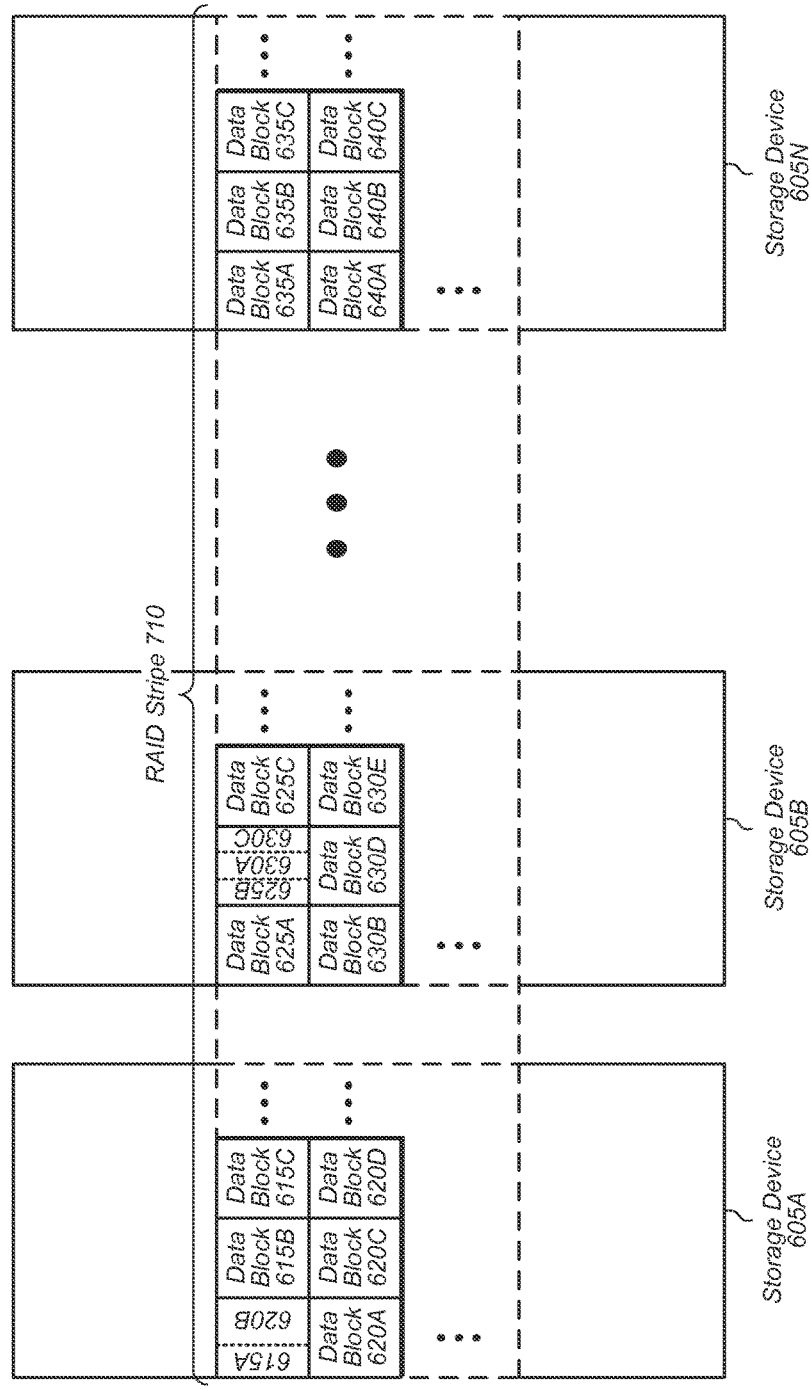
FIG. 7 is a block diagram of one embodiment of data blocks written to physical blocks of a group of storage devices as part of a RAID stripe.

Referring now to FIG. 7, a block diagram of one embodiment of input data blocks written to physical blocks of a group of storage devices as part of a RAID stripe 710 is shown. The block diagram of FIG. 7 is intended to be a further illustration of the logical block diagram of FIG. 6 which showed the assignment of input data blocks to storage devices within RAID stripe 610. RAID stripe 710 is intended to represent the actual assignment of input data blocks to physical blocks within storage devices 605A-N.

Accordingly, RAID stripe 710 of FIG. 7 shows the storage space savings achieved due to compression.

As shown in storage device 605A, input data blocks 615A and 620B may be compressed and stored within an individual physical block on storage device 605A. As shown in storage device 605B, input data blocks 625B, 630A, and 630C may be compressed and stored within an individual physical block of storage device 605B. Although not shown in RAID stripe 710, any number of other input data blocks may be compressed and combined into smaller numbers of physical storage device blocks to reduce the amount of data written to the storage devices by RAID stripe 710.

In one embodiment, the storage controller may assign input data blocks to individual storage devices within RAID stripe 710 so as to make the amount of physical blocks utilized in each chunk equal within the entire RAID stripe 710. In other words, the storage controller may analyze the storage space saved due to compression and spread the savings equally across each chunk of RAID stripe 710 to make the number of physical blocks utilized on each storage device for RAID stripe 710 equal.

Turning now to FIG. 8, one embodiment of a table 805 for storing mapping information of compressed and uncompressed blocks are shown. Table 805 is intended to represent one embodiment of a table with metadata associated with the data of RAID stripe 705 shown in FIG. 7. In another embodiment, the information in table 805 may be stored in two or more separate tables. It should be understood that the information shown in table 805 is combined into one table merely for ease of illustration.

In one embodiment, table 805 may include a field for specifying the order of the compressed blocks within the physical block storage location. As shown, the block with logical address specified as '615A' is stored first in physical address 0x8DAE and the block with logical address specified as '620B' is stored second in physical address 0x8DAE. The physical address (PA) reference count for physical address 0x8DAE since two different fingerprints point to physical address 0x8DAE. Also, the block with logical address specified as '625B' is stored first in physical address 0x4E73, the block with logical address specified as '630A' is stored second in physical address 0x4E73, and the block with logical address specified as '630C' is stored third in physical address 0x4E73. The PA reference count for physical address 0x4E73 since three different fingerprints point to physical address 0x4E73.

In other embodiments, table 805 may not include a field specifying the order, but rather the order may be implied based on the logical addresses (or other data) corresponding to the input data blocks. For example, in one embodiment, if multiple input data blocks are compressed into a single physical block, the input data blocks may be stored in the compressed physical block in the order of their logical addresses. Then, when the storage controller is reading from the compressed physical block, the storage controller will know how to determine the order of the compressed buffers within the physical block. In other embodiments, the compressed input blocks may be placed within a single physical block in an order based on other characteristics of the input blocks. For example, in another embodiment, the compressed input blocks may be ordered within a single physical block based on the magnitude of their fingerprint value (e.g., from lowest to highest fingerprint value). Also, although not shown in table 805, each entry may include a field to indicate how many compressed blocks are stored in a single physical block at the same physical address. In some cases, the number of compressed blocks which are stored in a single physical block at the same physical address may be determined from the physical address (PA) reference count immediately after the compressed data is written to the physical block. If one of the fingerprints referencing the physical block is later invalidated, the PA reference count will be reduced and will no longer accurately reflect the number of compressed input data blocks stored in the corresponding physical block. Alternatively, the number of compressed blocks which are stored in a single physical block may be stored in another table separate from table 805.

It may be assumed for the purposes of this discussion that the input data blocks shown in table 805 have not been previously encountered, and so the fingerprint reference counts (not shown) for each of these input data blocks may be recorded as one after the blocks are written to their corresponding storage devices. It may also be assumed that none of the fingerprints were matches to other fingerprints among the input blocks shown in this example.

In one embodiment, fingerprints may be generated prior to the input data blocks being compressed and combined into a single compressed buffer. This embodiment is represented in table 805, with input data blocks having different fingerprints even if they are stored at the same physical address in a compressed format. In another embodiment, fingerprints may be generated after the input data blocks have been compressed and combined into a single compressed buffer. In this embodiment, input data blocks which are compressed into a single compressed buffer will share the same fingerprint since the fingerprint is generated from the compressed data buffer.

Figure 9:
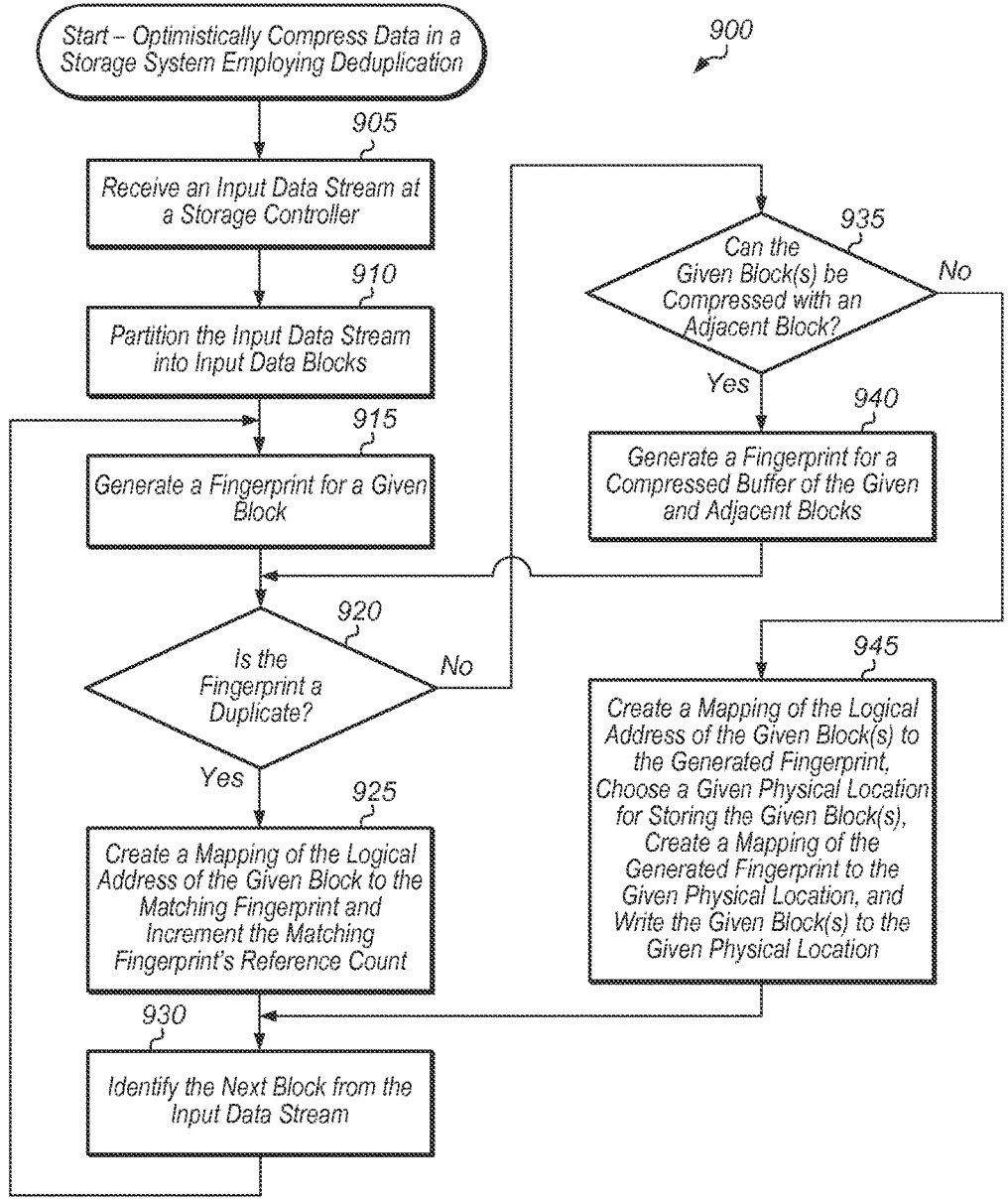
FIG. 9 is a generalized flow diagram illustrating one embodiment of a method for optimistically compressing data in a storage system employing deduplication.

Referring now to FIG. 9, one embodiment of a method 900 for optimistically compressing data in a storage system employing deduplication. The components embodied in system 100 described above (e.g., storage controller 110) may generally operate in accordance with method 900. In addition, the steps in this embodiment are shown in sequential order. However, some steps may occur in a different order than shown, some steps may be performed concurrently, some steps may be combined with other steps, and some steps may be absent in another embodiment.

A storage controller may receive an input data stream (block 905). The storage controller may partition the input data stream into input data blocks (block 910). The input data blocks may be referred to as blocks for short. In one embodiment, the input data stream may be partitioned into equal sized blocks. In one embodiment, the blocks of the input data stream may be 4 KB. In other embodiments, other sizes of blocks may be utilized for partitioning the input data stream. In another embodiment, the input data stream may be partitioned into variable-sized blocks.

Next, the storage controller may generate a fingerprint for a given block (block 915). Any type of fingerprint may be generated, from cryptographically strong fingerprints (e.g., SHA-0, SHA-1, SHA-2, SHA-3, MD4, MD5) to non-cryptographically strong fingerprints (e.g., hash, checksum). Next, the storage controller may determine if the fingerprint of the given block is a duplicate fingerprint (i.e., matches a previously generated fingerprint) (conditional block 920).

If the fingerprint of the given block is a duplicate fingerprint (conditional block 920, "yes" leg), then the storage controller may create a mapping of the logical address of the given block to the matching fingerprint and increment the matching fingerprint's reference count (block 925). In one embodiment, the storage controller may also store an indication of the size of the given block. For example, in one embodiment, the storage controller may store an indication that the given block is a first size if the given block is a match or is not compressible with any neighboring blocks. In this embodiment, the storage controller may store an indication that the given block is a second size if the given block and an adjacent block can be compressed to fit in a single physical block, wherein the second size is double the first size. In this embodiment, a single bit may be used to indicate whether the given block is of the first or second size. In other embodiments, multiple bits may be utilized to indicate the size if more than two sizes of groups of input data blocks may be compressed and stored in a single buffer. For example, in another embodiment, a storage controller may compress and store up to four adjacent input blocks together into a single compressed buffer, and the storage controller may utilize two bits to indicate the size of the group of input data blocks. After block 925, the storage controller may identify the next block from the input data stream (block 930), and then method 900 may return to block 915 with the storage controller generating a fingerprint for the next block.

If the fingerprint of the given block is a new fingerprint (conditional block 920, "no" leg), then the storage controller may determine if the given block(s) can be compressed with an adjacent block from the input data stream into a buffer smaller than or equal to a physical block on a target storage device (conditional block 935). If the given block(s) can be compressed with an adjacent block from the input data stream into a buffer smaller than or equal to a physical block on a target storage device (conditional block 935, "yes" leg), then the storage controller may generate a fingerprint for a compressed buffer of the given and adjacent blocks (block 940). After block 940, method 900 may return to conditional block 920 and the storage controller may determine if the fingerprint of the compressed buffer is a duplicate fingerprint.

If the given block(s) are not able to be compressed with an adjacent block from the input data stream into a buffer smaller than or equal to a physical block on a target storage device (conditional block 935, "no" leg), then the storage controller may create a mapping of the logical address of the given block (and any adjacent blocks) to the generated fingerprint, choose a given physical location for storing the given block(s), create a mapping of the generated fingerprint to the given physical location, and write the given block(s) to the given physical location (block 945). It is noted that the steps of block 945 may be performed together or separately, depending on the embodiment. For example, in one embodiment, the writing of the given block to the given physical location may be performed later than the other steps of block 945. In some embodiments, the storage controller may store an indication of the size of the group of input data blocks with the mapping of the logical address to the fingerprint. After block 945, method 900 may jump to block 930 with the storage controller identifying the next block from the input data stream.

Figure 10:
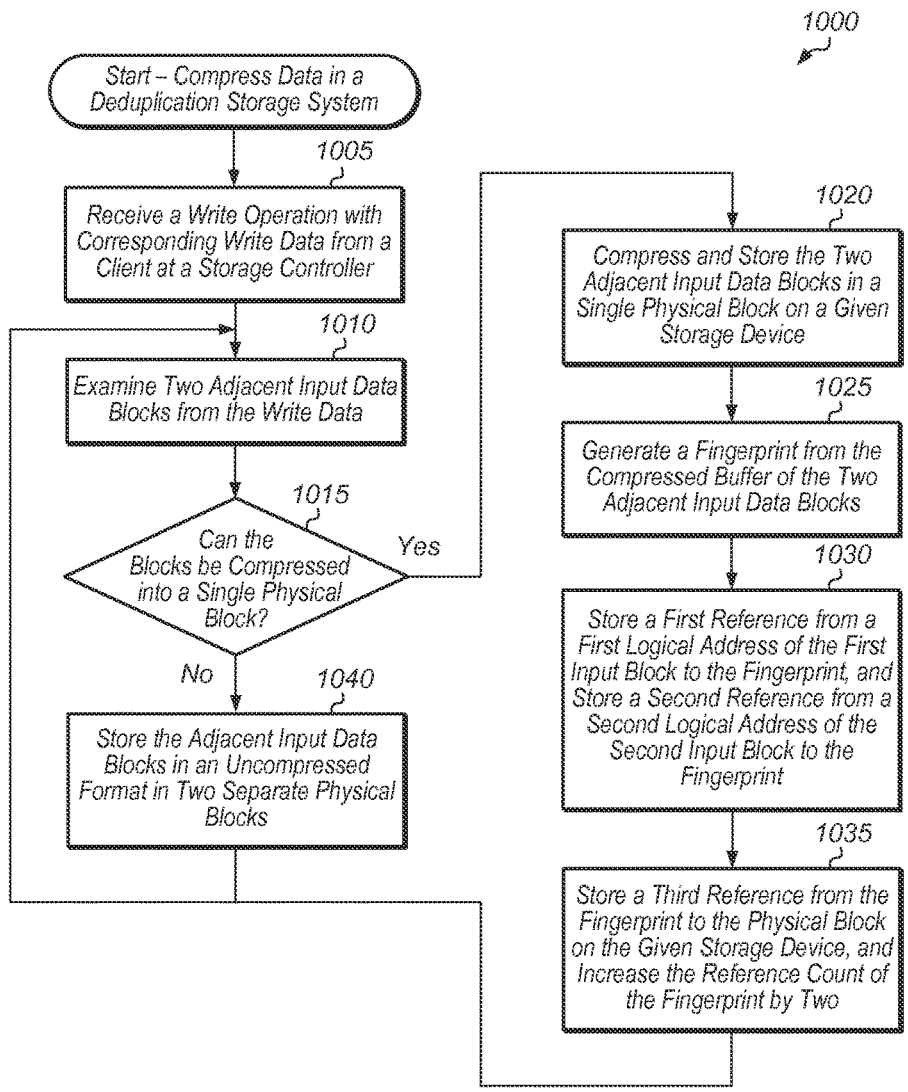
FIG. 10 is a generalized flow diagram illustrating one embodiment of a method for compressing data in a deduplication storage system.

Turning now to FIG. 10, one embodiment of a method 1000 for compressing data in a deduplication storage system is shown. The components embodied in system 100 described above (e.g., storage controller 110) may generally operate in accordance with method 1000. In addition, the steps in this embodiment are shown in sequential order. However, some steps may occur in a different order than shown, some steps may be performed concurrently, some steps may be combined with other steps, and some steps may be absent in another embodiment.

The storage controller may receive a write operation from a client with corresponding write data (block 1005). A storage system may include the storage controller coupled to one or more storage devices, wherein each storage device has a fixed physical block size for storing data written by the storage controller. Next, the storage controller may examine two adjacent input data blocks from the write data (block 1010). It will be assumed for the purposes of this discussion that the two adjacent input data blocks are not duplicates of existing data blocks stored in the storage system. Then, the storage controller may determine if the two adjacent input data blocks can be compressed into a single compressed buffer which will fit into a single physical block on a storage device coupled to the storage controller (conditional block 1015).

If the two adjacent input data blocks can be compressed into a single physical block on the storage device (conditional block 1015, "yes" leg), then the storage controller may compress and store the two adjacent input data blocks in a single physical block on a given storage device (block 1020). Also, the storage controller may generate a fingerprint from the compressed buffer of the two adjacent input data blocks (block 1025). Additionally, the storage controller may store a first reference from a first logical address of the first input block to a fingerprint generated from the compressed buffer, and the storage controller may store a second reference from a second logical address of the second input block to the fingerprint generated from the compressed buffer (block 1030). Still further, the storage controller may store a third reference from the fingerprint to the physical block on the given storage device and the storage controller may increase the reference count of the fingerprint by two (block 1035). It is noted that the generation of the metadata in blocks 1030 and 1035 may vary according to the embodiment. After block 1035, method 1000 may return to block 1010 with the storage controller examining the next two adjacent input blocks of the input stream of the write data.

If the two adjacent input blocks cannot be compressed into a single physical block on the storage device (conditional block 1015, "no" leg), then the storage controller may store the two adjacent input data blocks in an uncompressed format in two separate physical blocks (block 1040). It may be assumed for the purposes of this discussion that the size of an input data block is equal to the size of a physical block on the storage devices. The storage controller may generate metadata for the two adjacent input blocks in accordance with the normal processing of uncompressed data. It is noted that the generation of metadata for uncompressed input data blocks may vary according to the embodiment. After block 1040, method 1000 may return to block 1010 with the storage controller examining the next two adjacent input data blocks of the write data.

Figure 11:
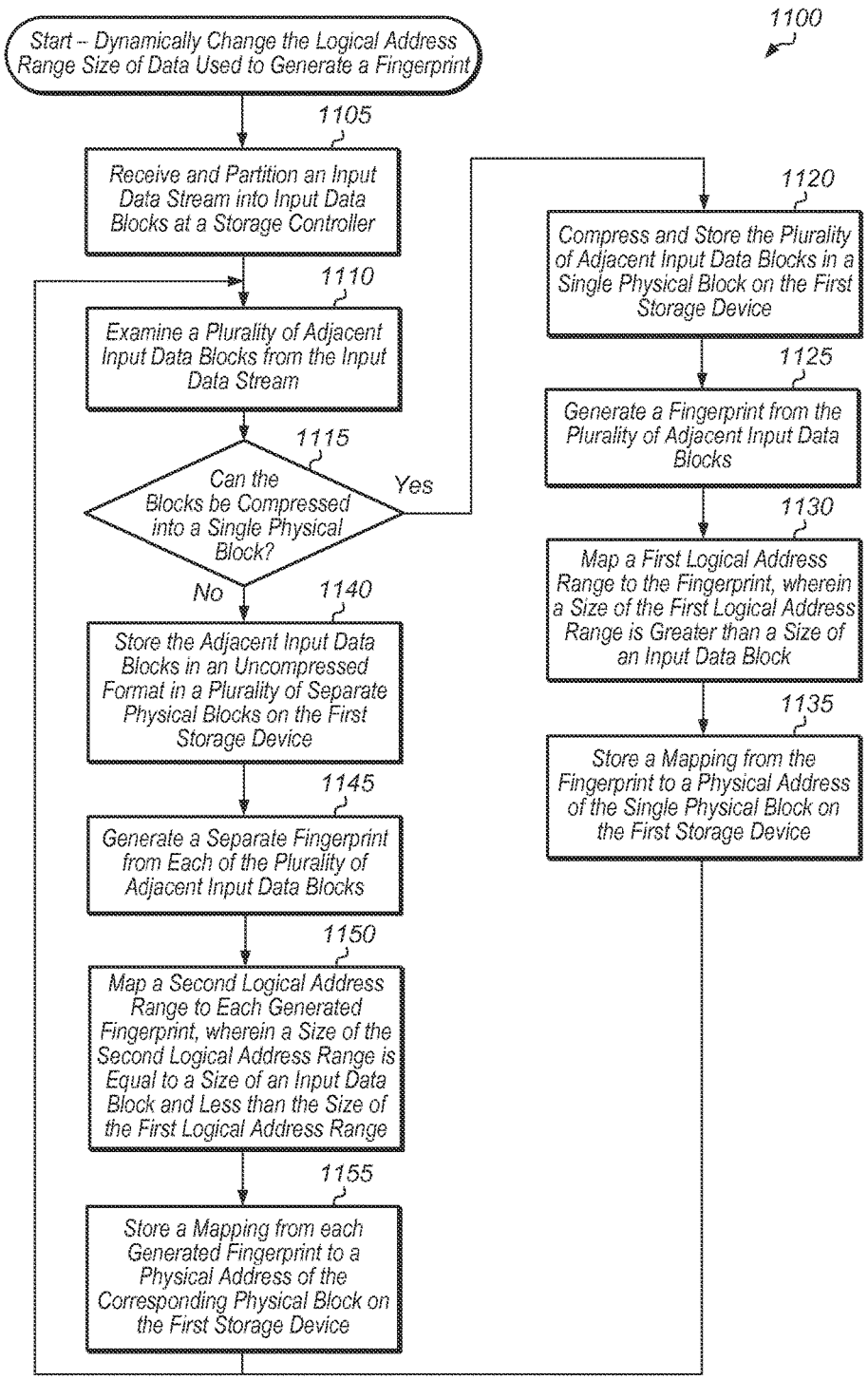
FIG. 11 is a generalized flow diagram illustrating one embodiment of a method for dynamically changing the logical address range size used to generate a fingerprint.

Referring now to FIG. 11, one embodiment of a method 1100 for dynamically changing the logical address range size of data used to generate a fingerprint is shown. The components embodied in system 100 described above (e.g., storage controller 110) may generally operate in accordance with method 1100. In addition, the steps in this embodiment are shown in sequential order. However, some steps may occur in a different order than shown, some steps may be performed concurrently, some steps may be combined with other steps, and some steps may be absent in another embodiment.

A storage controller may receive and partition an input data stream into input data blocks (block 1105). The storage controller may be coupled to at least a first storage device, wherein the first storage device has a minimal addressable storage unit which is a single physical storage block. Next, the storage controller may examine a plurality of adjacent input data blocks from the input data stream (block 1110). In another embodiment, the storage controller may examine a plurality of non-adjacent input data blocks. Then, the storage controller may determine if the plurality of adjacent input data blocks can be compressed into a single physical storage block (conditional block 1115). In one embodiment, the storage controller may determine if the plurality of adjacent input data blocks can be compressed into a single physical storage block by compressing the plurality of adjacent input data blocks into a compressed buffer and comparing the size of the compressed buffer to the size of a single physical storage block.

If the plurality of adjacent input data blocks can be compressed into a single physical storage block (conditional block 1115, "yes" leg), then the storage controller may compress and store the plurality of adjacent input data blocks in a single physical storage block on the first storage device (block 1120). Also, the storage controller may generate a fingerprint from the plurality of adjacent input data blocks (block 1125). Additionally, the storage controller may map a first logical address range to the fingerprint, wherein a size of the first logical address range is greater than a size of an input data block (block 1130). The first logical address range size may be equal to the size of the total logical address range of the plurality of input data blocks. For example, if each input data block is 8 KB, and there are four input data blocks being compressed into a single physical storage block, the first logical address range size is 32 KB. Additionally, the storage controller may store a mapping from the fingerprint to a physical address of the single physical storage block on the first storage device (block 1135). In one embodiment, the mapping may include an indicator which represents the first logical address range size. After block 1135, method 1100 may return to block 1110 to examine the next plurality of adjacent input data blocks from the input data stream.

If the plurality of adjacent input data blocks cannot be compressed into a single physical storage block (conditional block 1115, "no" leg), then the storage controller may store the plurality of adjacent input data blocks in an uncompressed format in a plurality of physical storage blocks on the first storage device (block 1140). Also, the storage controller may generate a separate fingerprint from each of the plurality of adjacent input data blocks (block 1145). Additionally, the storage controller may map a second logical address range to each generated fingerprint, wherein a size of the second logical address range is equal to a size of an input data block, and wherein the size of the second logical address range is less than the size of the first logical address range (block 1150). Additionally, the storage controller may store a mapping from each generated fingerprint to a physical address of the corresponding physical storage block on the first storage device (block 1155). After block 1150, method 1100 may return to block 1110 to examine the next plurality of adjacent input data blocks from the input data stream.

Figure 12:
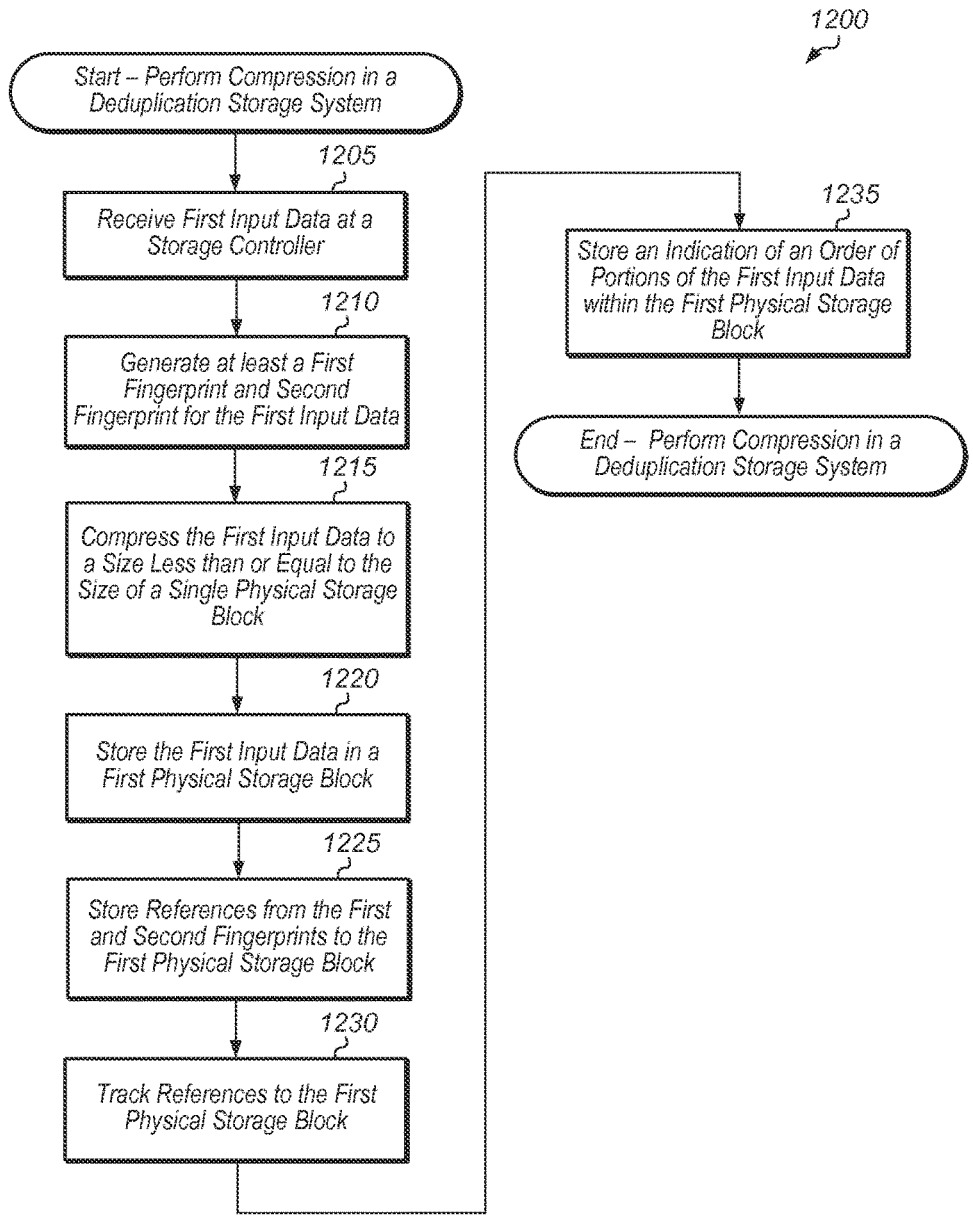
FIG. 12 is a generalized flow diagram illustrating one embodiment of a method for performing compression in a deduplication storage system.

Referring now to FIG. 12, one embodiment of a method 1200 for performing compression in a deduplication storage system is shown. The components embodied in system 100 described above (e.g., storage controller 110) may generally operate in accordance with method 1200. In addition, the steps in this embodiment are shown in sequential order. However, some steps may occur in a different order than shown, some steps may be performed concurrently, some steps may be combined with other steps, and some steps may be absent in another embodiment.

A storage controller may receive first input data (block 1205). The storage controller may be coupled to at least a first storage device, wherein the first storage device has a minimal addressable storage unit which is a single physical storage block. It may be assumed for the purposes of this discussion that the size of the first input data is greater than a size of a single physical storage block. In one embodiment, the first input data may include one or more input data blocks partitioned from an input data stream. The storage controller may generate at least a first fingerprint and second fingerprint for the first input data (block 1210). For example, in one embodiment, the first input data may be 8 KB, and the first fingerprint may be generated for the first 4 KB of the first input data and the second fingerprint may be generated for the second 4 KB of the first input data. It may be assumed for the purposes of this discussion that the first and second fingerprints are new fingerprints (i.e., do not match any existing fingerprints in the system).

The storage controller may compress the first input data to a size less than or equal to the size of a single physical storage block (block 1215). In one embodiment, the first input data may have an uncompressed size of 8 KB and a single physical storage block may have a size of 4 KB. In other embodiments, the sizes of the first input data and a single physical storage block may vary. Next, the storage controller may store the first input data in a first physical storage block (block 1220). Then, the storage controller may store references from the first and second fingerprints to the first physical storage block (block 1225).

Additionally, the storage controller may track references to the first physical storage block (block 1230). In one embodiment, tracking references to the first physical storage block may include maintaining a physical address reference count to track a number of different fingerprints which reference the first physical storage block. In this embodiment, the storage controller may increase the physical address reference count by an amount equal to a number of fingerprints generated for the first input data. In other embodiments, the storage controller may not maintain a physical address reference count, but may instead utilize other techniques (e.g., mark-and-sweep) which are not based on reference counts.

After block 1230, the storage controller may store an indication of an order of portions of the first input data within the first physical storage block (block 1235). For example, in one embodiment, the first input data may comprise a plurality of input data blocks, and the storage controller may be configured to store an indication of an order of the plurality of input data blocks within the first physical storage block. After block 1235, method 1200 may end.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a storage device; and
   a storage controller coupled to the storage device, wherein the storage controller is configured to:
   generate at least a first fingerprint and a second fingerprint for first input data, wherein a size of the first input data is greater than a size of a single physical storage block;
   compress the first input data to a size less than or equal to the size of a single physical storage block;
   generate, for the compressed first input data, a third fingerprint;
   store references from the first, second, and third fingerprints to a first physical storage block storing the compressed first input data; and
   free the first physical storage block if there are no remaining references to the first physical storage block.

2. The system as recited in claim 1, wherein the storage controller is configured to maintain a physical address reference count to track a number of different fingerprints which reference the first physical storage block, and free the first physical storage block via garbage collection when the physical address reference count is zero.

3. The system as recited in claim 2, wherein the storage controller is configured to increase the physical address reference count by an amount equal to a number of fingerprints generated for the first input data.

4. The system as recited in claim 1, wherein the storage controller is configured to free the first physical storage block using a mark and sweep algorithm.

5. The system as recited in claim 1, wherein the storage controller is configured to discard the first and second fingerprints responsive to determining the first input data can be compressed to a size less than or equal to the size of a single physical storage block and responsive to determining that neither of the first and second fingerprints match any existing fingerprints.

6. The system as recited in claim 1, wherein the first input data comprises a plurality of adjacent input data blocks within an input data stream, and wherein a size of each adjacent input data block is greater than or equal to a size of a single physical storage block on the storage device.

7. A method comprising:
   generating at least a first fingerprint and a second fingerprint for first input data, wherein a size of the first input data is greater than a size of a single physical storage block;
   compressing the first input data to a size less than or equal to the size of a single physical storage block;
   generating, for the compressed first input data, a third fingerprint;
   storing references from the first, second, and third fingerprints to a first physical storage block storing the compressed first input data; and
   freeing the first physical storage block if there are no remaining references to the first physical storage block.

8. The method as recited in claim 7, further comprising:
   maintaining a physical address reference count to track a number of different fingerprints which reference the first physical storage block; and
   freeing the first physical storage block via garbage collection when the physical address reference count is zero.

9. The method as recited in claim 8, further comprising increasing the physical address reference count by an amount equal to a number of fingerprints generated for the first input data.

10. The method as recited in claim 7, further comprising freeing the first physical storage block using a mark and sweep algorithm.

11. The method as recited in claim 7, further comprising discarding the first and second fingerprints responsive to determining the first input data can be compressed to a size less than or equal to the size of a single physical storage block and responsive to determining that neither of the first and second fingerprints match any existing fingerprints.

12. The method as recited in claim 7, wherein the first input data comprises a plurality of adjacent input data blocks within an input data stream, and wherein a size of each adjacent input data block is greater than or equal to a size of a single physical storage block on the storage device.

13. A non-transitory computer readable storage medium storing program instructions, wherein the program instructions are executable by a processor to:
   generate at least a first fingerprint and a second fingerprint for first input data, wherein a size of the first input data is greater than a size of a single physical storage block;
   compress the first input data to a size less than or equal to the size of a single physical storage block;
   generate, for the compressed first input data, a third fingerprint
   store references from the first, second, and third fingerprints to a first physical storage block storing the compressed first input data; and
   free the first physical storage block if there are no remaining references to the first physical storage block.

14. The non-transitory computer readable storage medium as recited in claim 13, wherein the program instructions are executable by a processor to:
   maintain a physical address reference count to track a number of different fingerprints which reference the first physical storage block; and
   free the first physical storage block via garbage collection when the physical address reference count is zero.

15. The non-transitory computer readable storage medium as recited in claim 14, wherein the program instructions are executable by a processor to increase the physical address reference count by an amount equal to a number of fingerprints generated for the first input data.

16. The non-transitory computer readable storage medium as recited in claim 13, wherein the first input data comprises a plurality of input data blocks, and wherein the program instructions are executable by a processor to free the first physical storage block using a mark and sweep algorithm.

17. The non-transitory computer readable storage medium as recited in claim 13, wherein the program instructions are executable by a processor to discard the first and second fingerprints responsive to determining the first input data can be compressed to a size less than or equal to the size of a single physical storage block and responsive to determining that neither of the first and second fingerprints match any existing fingerprints.

* * * * *